(12) United States Patent
Graßl

(10) Patent No.: US 11,515,763 B2
(45) Date of Patent: Nov. 29, 2022

(54) METHOD FOR OPERATING A MOTOR VEHICLE WITH A PERMANENTLY-EXCITED SYNCHRONOUS MACHINE, AND MOTOR VEHICLE

(71) Applicant: AUDI AG, Ingolstadt (DE)

(72) Inventor: Tobias Graßl, Denkendorf (DE)

(73) Assignee: Audi AG, Ingolstadt (DE)

( * ) Notice: Subject to any disclaimer, the term of this patent is extended or adjusted under 35 U.S.C. 154(b) by 260 days.

(21) Appl. No.: 17/016,113

(22) Filed: Sep. 9, 2020

(65) Prior Publication Data

US 2021/0075286 A1     Mar. 11, 2021

(30) Foreign Application Priority Data

Sep. 10, 2019 (DE) .......................... 102019124214.2

(51) Int. Cl.
| | |
|---|---|
| *H02K 11/33* | (2016.01) |
| *H02K 3/28* | (2006.01) |
| *B60R 16/03* | (2006.01) |
| *F02N 11/04* | (2006.01) |

(52) U.S. Cl.
CPC .......... *H02K 11/33* (2016.01); *B60R 16/0307* (2013.01); *F02N 11/04* (2013.01); *H02K 3/28* (2013.01)

(58) Field of Classification Search
CPC .......... H02K 3/28; H02K 11/33; H02K 7/006; H02K 21/12; H02K 2213/03; B60R 16/0307; F02N 11/04; F02N 2011/0896; Y02T 10/72; H02M 1/36; H02M 1/32; B60L 3/00; B60L 15/20; H02P 25/024; H02P 27/08
See application file for complete search history.

(56) References Cited

FOREIGN PATENT DOCUMENTS

| | | | | |
|---|---|---|---|---|
| DE | 19743757 A1 | * | 4/1999 | .............. B60L 11/14 |
| DE | 102010031583 A1 | | 1/2012 | |
| DE | 102016210238 A1 | | 12/2017 | |
| EP | 2433830 A1 | | 3/2012 | |
| WO | WO-2013178946 A1 | * | 12/2013 | ........... H02H 1/0053 |
| WO | WO-2015090746 A1 | * | 6/2015 | ................ B60L 3/00 |

* cited by examiner

*Primary Examiner* — Mohamad A Musleh
(74) *Attorney, Agent, or Firm* — Seed Intellectual Property Law Group LLP

(57) ABSTRACT

A method for operating a motor vehicle is provided, having, as a prime mover, a permanently-excited synchronous machine with windings. The synchronous machine is connected to a vehicle electrical system of the motor vehicle via a converter having a switching arrangement and a capacitor in an intermediate circuit. The switching arrangement can be controlled via a control device connected to the vehicle electrical system. The permanently-excited synchronous machine is operated as a generator while being driven by external means. Energy generated by the synchronous machine and stored in the capacitor for operating the control device and the switching arrangement is provided when a first threshold value for the voltage in the intermediate circuit is exceeded. When a second threshold value for the voltage in the intermediate circuit is exceeded, the switching arrangement is activated for short-circuiting the windings of the synchronous machine.

8 Claims, 2 Drawing Sheets

METHOD FOR OPERATING A MOTOR VEHICLE WITH A PERMANENTLY-EXCITED SYNCHRONOUS MACHINE, AND MOTOR VEHICLE

BACKGROUND

Technical Field

The disclosure relates to a method for operating a motor vehicle, having, as a prime mover, a permanently-excited synchronous machine with windings, during a driving of the motor vehicle by external means. The synchronous machine is connected to a vehicle electrical system of the motor vehicle via a converter having a switching arrangement and a capacitor in an intermediate circuit, and the switching arrangement can be controlled via a control device connected to the vehicle electrical system. The permanently-excited synchronous machine is operated as a generator during the driving by external means. Energy generated by the synchronous machine and stored in the capacitor for operating the control device and the switching arrangement is provided when a first threshold value for the voltage in the intermediate circuit is exceeded. When a second threshold value for the voltage in the intermediate circuit is exceeded, the switching arrangement is activated for short-circuiting the windings of the synchronous machine.

In addition, the present disclosure relates to a motor vehicle.

Description of the Related Art

Modern electric motor vehicles frequently use permanently-excited synchronous machines (PSM) as the prime mover. A permanently-excited synchronous machine has a permanent magnet in the stator or in the rotor, wherein associated windings are then arranged in the rotor or stator. Problems can occur if the motor vehicle with the permanently-excited synchronous machine is externally driven, in particular, during a towing operation. In such a towing operation of a motor vehicle, in particular, an electric motor vehicle with a permanently-excited synchronous machine, the synchronous machine is usually operated in a generator mode, i.e., as a generator, so that a current is fed via the windings into the high-voltage intermediate circuit of the converter which is assigned to the synchronous machine.

For safety reasons, when the high-voltage battery (HV battery) is removed, the voltage resulting in the intermediate circuit is kept low, which is why, usually, the circuit breakers of the converter (pulse-controlled inverter) are used to bring about a short circuit, in particular, a short circuit of the windings themselves or a short circuit to a ground potential. Such a short circuit is also called an active short circuit because the drivers of the circuit breakers are supplied with energy for the duration of the short circuit. An energy supply is therefore utilized for controlling the circuit breakers of the switching arrangement of the converter, in particular, in a low-voltage component of the vehicle electrical system of the motor vehicle, from which the control device associated with the switching arrangement and usually also the drivers of the circuit breakers are operated.

In order to nevertheless ensure an energy supply in the event of a lack of energy supply in the vehicle electrical system of the motor vehicle, e.g., in the case of a torn connection and/or deliberately disconnected batteries, it has been proposed to use the energy generated by the synchronous machine as a generator in order to bring about the short circuit. Specifically, it can thus be provided that, when the synchronous machine feeds energy into the vehicle electrical system, the switching arrangement of the converter be activated as soon as possible in order to bring about the short circuit. Then, however, no more energy is fed into the intermediate circuit, so that the latter discharges. In this case, the short circuit is kept active until the intermediate circuit voltage has fallen to the point that the voltage supply, in particular, the at least one driver of the circuit breakers, can no longer provide energy for the active short circuit. The capacitor of the intermediate circuit then begins to recharge, and the cycle begins again.

The permanent alternation of charging operation via the permanently-excited synchronous machine and discharging operation via the voltage supply of the switching arrangement results in a pulse operation for the voltage supply and the associated activation electronics of the converter, in the present case, in the form of the control device. It should be noted that a certain start-up time is provided each time until a stable voltage supply can be made available to the drivers of the circuit breakers for the activation of the short circuit. In particular, a sufficient starting voltage is first provided so that, for example, a DC/DC converter can provide electrical energy from the high-voltage vehicle electrical system to a low-voltage component of the vehicle electrical system; the control device is put into operation. In particular, controllers are thus started up, the current external drive state is determined, and the corresponding control commands are generated and implemented. In order for this start-up time, which ultimately determines how high the voltage in the intermediate circuit has risen, to be kept as low as possible, a special design of the control device and of the switching arrangement is currently utilized, which is intended to allow rapid starting with extremely low voltages in the intermediate circuit. This makes the design more difficult and thus increases costs and installation space in the motor vehicle.

EP 2 433 830 A1 relates to a method and a controller for providing electrical energy from a driven, three-phase synchronous machine. In this case, the three-phase synchronous machine is assigned a multiphase converter which has upper switches and lower switches and at least one intermediate circuit capacitor arranged in or on an intermediate circuit of the converter. By means of an active short circuit, in which all the upper switches or all the lower switches are closed, a safe state is brought about in the case of a towed motor vehicle or a vehicle which is driven or rolls out externally (hybrid, or at the roller test stand), and/or has no usable intermediate circuit voltage supply, in which high voltages in the intermediate circuit are prevented and braking torques are reduced. In this case, it is specifically proposed to discharge the energy stored in the capacitor via various consumers, in particular, also the upper or lower switches, until the drivers for the switches can no longer be supplied, and the active short circuit is interrupted. A periodic short circuit is thus generated, the sequence of which results via internal and external consumers, system capacity, and motor type. In this case, it is problematic that, because the voltage in the intermediate circuit is so low that the drivers can no longer be operated, a new start-up period is utilized during which the voltage in the intermediate circuit can rise too far during the voltage reversal.

DE 10 2010 031 583 A1 relates to a method and a device for operating an electric drive device for a motor vehicle during towing, wherein a drive electromotor is directly coupled to a drive axle. The drive motor can be short-circuited by a short-circuit device. The short-circuit device has a temperature sensor for detecting its operating temperature, wherein, when a parking brake device is actuated to unlock it, it is checked whether the high-voltage vehicle electrical system is in the correct state, and in this case the parking brake device unlocks and the short-circuit device is activated. The short-circuit device is deactivated when the temperature sensor detects an impermissibly high temperature. Thus, independently of the later availability of the low-voltage vehicle electrical system, safe towing of an electric vehicle is to be enabled without significant structural expenditure.

DE 10 2016 210 238 A1 relates to a method and a protection device for limiting the torque for an electric machine. In the case of an error in a permanently-excited synchronous machine, the vehicle is to be brought into a safe state with respect to the electric drive. For this purpose, it is proposed to detect at least one current actual value of at least one phase current of the machine in active short-circuit operation, to derive current rotational speed information from this actual value, to compare this with a predeterminable rotational speed threshold, and then to generate a switching signal for switching from active short-circuit operation to freewheeling when the current rotational speed information indicates a rotational speed which falls below the predeterminable rotational speed threshold. The switching signal is used to actuate the converter.

BRIEF SUMMARY

Embodiments of the present disclosure achieve increased safety in electric motor vehicles having a permanent synchronous machine when being driven by external means, in particular, when towing, when there is no supply by a battery in the vehicle electrical system.

Embodiments of the present disclosure provide a method that actives a switching arrangement in the presence of an active short circuit, in order to end the short circuit when a third threshold value for the voltage in the intermediate circuit is undershot. The third threshold value is higher than the first threshold value and higher than a minimum voltage necessary for maintaining the switching state of the switching arrangement.

In the context of the present disclosure, it is assumed that no further electrical energy source is available in the vehicle electrical system, in particular, no batteries are fed into the vehicle electrical system. In particular, neither a high-voltage battery of a high-voltage component of the vehicle electrical system nor a low-voltage battery of a low-voltage component of the vehicle electrical system is connected. In this context, it is proposed to adapt the activation behavior of the active short circuit, starting from the state of the art. The basic idea here is to carry out the active short circuit in a pulsed manner, so that the fed-back energy of the permanently-excited synchronous machine can be regulated, and thus the intermediate circuit voltage can be kept at a relatively constant, harmless value. This can be implemented, for example, via a simple, two-point controller as part of the control device, which then regulates to the second and the third threshold values. If the voltage falls below the third threshold value, the active short circuit of the converter is deactivated. If the voltage in the intermediate circuit rises again to an upper threshold (the second threshold value), the automatic short circuit is activated again. In this case, it is beneficial that the voltage supply for the switching arrangement of the converter and the control device always remain active after the first threshold value is no longer undershot.

In other words, the voltage in the intermediate circuit, i.e., the high voltage, can be kept within a harmless value range by principles of the present disclosure. This has the advantage that the voltage supply including activation electronics always remains active, and the switch-on cycles are thus drastically reduced. In particular, the dead time that results from the start-up time of the control device and the voltage supply, in particular, of at least one driver, is eliminated. In a three-phase synchronous machine, it is customary to provide three drivers. This dead time is present only when starting for the first time, since the control device is then activated, and the supply voltage for operating the switching arrangement, exceeding the minimum voltage, is provided. However, at all later time cycles, there is an extremely rapid change between activating and deactivating the active short circuit. This is due to the fact that the control device is kept active after its first activation, and the switching arrangement remains controllable at all times during this time period.

The controlled, pulsed operation thus results in a type of pulse-width modulation which, on account of the permanently active components, has a defined frequency, which is preferably selected to be high. Thus, advantageous embodiments of the present disclosure provide, for example, for the second and the third threshold values to be selected, in particular, also dynamically, for setting a pulse frequency lying in a frequency range, thus depending upon the current external drive power, which is reflected in the energy fed into the intermediate circuit by the synchronous machine. The frequency range may be a sub-range between 50 and 1,000 hertz, and preferably between 500 and 1,000 hertz in one embodiment. When selecting high frequencies, excessive torque differences at the synchronous machine are also avoided, which could lead to jolting of the motor vehicle, for example, during towing. Because the active short circuit ultimately leads to a kind of idling. In addition, at high-pulse frequencies, the second and third threshold values are close to each other, so that a substantially constant intermediate circuit voltage can result at (or around) a predefined value in the range of 40 to 60 volts, in one embodiment. In one embodiment the predefined value is 50 V. Other procedures for intentionally holding the pulse frequency high are also conceivable.

In one embodiment, it can be provided that the control device be connected to a low-voltage component of the vehicle electrical system, which is connected via a DC/DC converter to a high-voltage component of the vehicle electrical system to which the synchronous machine is connected. Usually, a battery is also connected to the low-voltage component of the vehicle electrical system, whose low voltage is lower than the high voltage of the high-voltage component of the vehicle electrical system, but which battery in the present case cannot supply the electrical energy to bring about the active short circuit and, in particular, to also operate the control device. This may be due to an accident or an intentional disconnection. However, since the low-voltage component is usually connected to the high-voltage component of the vehicle electrical system via a DC/DC converter, it is possible to pass along the electrical energy present in the high-voltage component, here generated by the synchronous machine, to the low-voltage component whose low voltage can be 12 V, for example. The third threshold value for the voltage in the intermediate circuit is, expediently, also selected such that the DC/DC converter can remain in operation continuously, so that dead times are also eliminated here, such that, ultimately, a continuous presence of electrical energy in the low-voltage component of the vehicle electrical system can be ensured.

The switching arrangement can, expediently, have several circuit breakers to which at least one driver is assigned for providing a supply voltage, which is fed, in particular, from the low-voltage component. In a particular example there are six circuit breakers. In a particular example the circuit breakers are field-effect transistors and/or insulated-gate bipolar transistors (IGBTs). If the at least one driver can be supplied with the supply voltage (gate voltage) from the low-voltage component, the active short circuit can therefore be completely controlled from the low-voltage component. In a particular example the at least one driver includes three drivers. The at least one driver can be understood as part of the control device and can be realized, for example, as a single IC. Particularly in the case of a three-phase connection of the permanently-excited synchronous machine, the converter can have six circuit breakers, which can be divided into two groups with three switches each, wherein, for example, three half-bridges can be provided in which a circuit breaker is connected in parallel to each diode. Overall, for example, three half-bridges can be used in three phases.

The second threshold value can, expediently, be selected to be smaller than a peak voltage occurring during the initial start-up of the vehicle electrical system by the external drive. It has been shown that, during the initial start-up, in which the electrical energy initially has to be generated first in order to supply the low-voltage component of the vehicle electrical system, to start up the control device or its at least one controller, and to provide the supply voltage for the switching arrangement, this can lead to still quite high voltages, e.g., of more than 60 V, in the intermediate circuit. Since this longer period of time is determined by dead times and the like, which are no longer present at the end, it is, advantageously, possible within the scope of the present disclosure to select the second threshold value as a whole to be significantly lower than this peak voltage, e.g., at 45 to 55 V or the like, so that, in particular, a quite small voltage range can also be achieved in the further course.

Specifically, it can be provided, for example, that the first threshold value be selected in the range of 20 to 40 V, and/or the second threshold value in the range of 50 to 60 V, and/or the third threshold value in the range of 35 to 50 V. For example, in some embodiments the voltage of the intermediate circuit moves between 45 V (third threshold) and 55 V (second threshold) or the like when changing between active short circuit and deactivated short circuit. Consequently, the voltage in the intermediate circuit and thus in the high-voltage component of the vehicle electrical system can be kept approximately constant in harmless voltage ranges.

In addition to the method, the present disclosure also relates to a motor vehicle having, as a prime mover, a permanently-excited synchronous machine with windings. The synchronous machine is connected to a vehicle electrical system of the motor vehicle via a converter having a switching arrangement and a capacitor in an intermediate circuit. The switching arrangement can be controlled via a control device connected to the vehicle electrical system. The control device is designed for carrying out the method according to the present disclosure. All designs related to the method according to the present disclosure can be analogously transferred to the motor vehicle according to the present disclosure, with which the aforementioned advantages can likewise be attained.

BRIEF DESCRIPTION OF THE SEVERAL VIEWS OF THE DRAWINGS

Additional advantages and individual details result from the exemplary embodiments described below, as well as the drawings. The following are shown.

DETAILED DESCRIPTION

Figure 1:
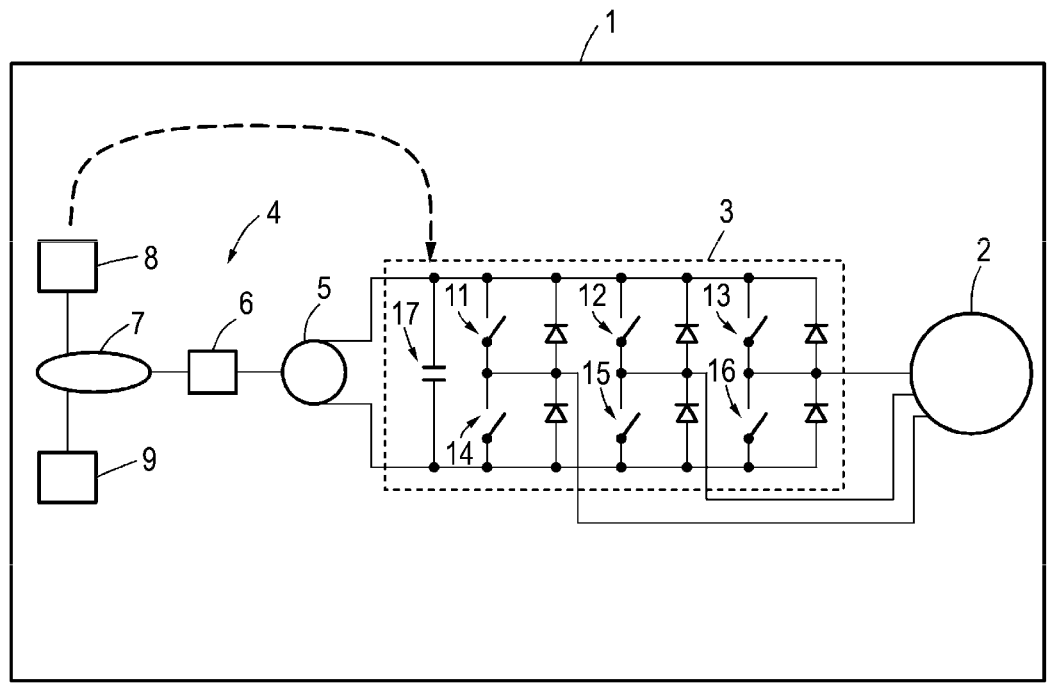
FIG. 1 illustrates a schematic diagram of relevant components of a motor vehicle, according to one embodiment.

FIG. 1 shows a schematic diagram of relevant components of a motor vehicle 1. The motor vehicle 1 is an electric motor vehicle 1 which uses a permanently-excited synchronous machine 2 as a drive motor. The permanently-excited synchronous machine 2 has a permanently magnetized rotor or stator and associated windings, not shown in greater detail here, on the stator or rotor, which can also be referred to as motor windings. In the present exemplary embodiment, the synchronous machine 2 operates as three-phase, so that it is connected via a converter 3 to a high-voltage component 5 of a vehicle electrical system 4 of the motor vehicle 1. The high-voltage component 5 of the vehicle electrical system 4 is connected via a DC/DC converter 6 to a low-voltage component 7 of the vehicle electrical system 4, to which in this case a control device 8, also responsible for the converter 3, and a low-voltage battery 9 are connected.

The converter 3 includes three half-bridges the diodes of which are in each case connected in parallel to circuit breakers 11 through 16 of a switching arrangement of the converter 3. The circuit breakers 11 through 13 form a first switch group, and the circuit breakers 14 through 16 form a second switch group. A capacitor 17 (intermediate circuit capacitor) is also provided in the intermediate circuit of the converter 3.

The circuit breakers 11 are embodied, for example, as field-effect transistors (FET) or as IGBTs. A supply voltage/gate voltage can be provided via corresponding drivers, in the present case, one driver per phase, i.e., three drivers, in order to control the switching state of the respective circuit breakers 11 through 16. In the present case, the switch arrangement can be controlled by the control device 8 including the three drivers in such a way that an active short circuit is brought about. This is done in the present case by closing all the switches 11 through 13 of the first switch group or closing all switches 14 through 16 of the second switch group. In each case, the windings of the permanently-excited synchronous machine 2 are then short-circuited, so that, in the case of being driven by external means—in particular, when the motor vehicle 1 is towed—and where the active short circuit is present, the capacitor 17 is not charged, which means that no high voltage arises in the intermediate circuit.

This is problematic whenever there is no energy available for the control device 8 and for the drivers of the circuit breakers 11 through 16 in the motor vehicle 1. This can be the case, for example, if the battery 9 is no longer connected to the low-voltage component 7 of the vehicle electrical system 4 due to an accident or intentionally.

Figure 2:
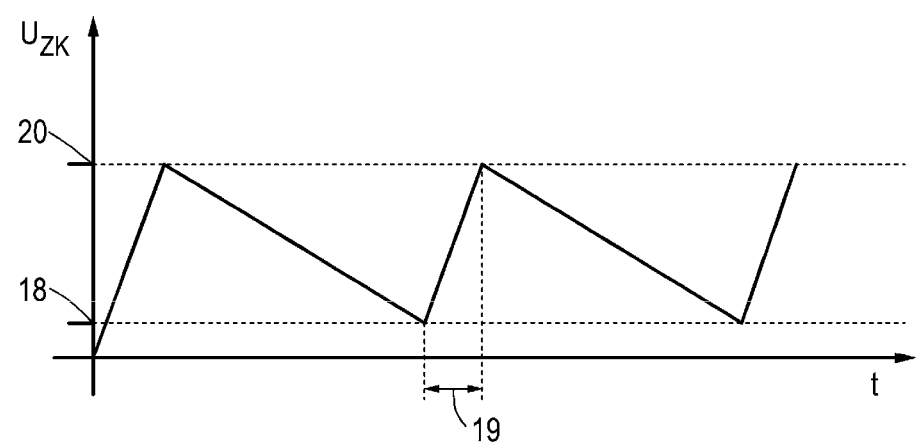
FIG. 2 illustrates a profile of the voltage in the intermediate circuit according to the prior art.

In this case, it has been proposed in the prior art, as explained in more detail by FIG. 2, to use the energy fed back by the synchronous machine 2 itself, in order to operate the control device 8 and the switching arrangement. If a certain starting voltage 18 is reached as the first threshold value, the DC/DC converter 6 can transmit the energy from the high-voltage component 5 to the low-voltage component 7, and the control device 8 or its at least one controller can be started up, wherein the supply voltage for the drivers of the circuit breakers 11 through 16 is also provided. This takes a certain time period 19 (cf. FIG. 2), during which the voltage in the intermediate circuit ($U_{ZK}$) reaches a peak voltage 20. At this time, the controller 8, which has determined that towing is occurring, can activate the switch arrangement—here, specifically the drivers—in order to energize the switches 11 through 13 or 14 through 16 of the first or second switch group, respectively, so that the active short circuit is produced. Accordingly, as can be seen from FIG. 2, the voltage in the intermediate circuit now decreases again. According to the prior art, the active short circuit is kept active until the intermediate circuit voltage has fallen enough that sufficient energy can no longer be provided for the drivers, and thus the active short circuit, so that the complete start-up time 19 is required again from this point in time until the active short circuit can be activated again—once again reaching the peak voltage 20.

The present disclosure now deviates from this concept, as will be explained in more detail by FIG. 3. There, the voltage in the intermediate circuit ($U_{ZK}$) versus the time (t) is again shown, although the activation by the control device 8 is modified. Before first activating the active short circuit, the situation is still exactly as in FIG. 2. In the intermediate circuit, a voltage is slowly built up by means of the capacitor 17, wherein, when the start-up voltage 18 (corresponding to the first threshold value 21) is reached, the start-up time 19 is again utilized in order to start and prepare relevant components—in this case, in particular, to supply the low-voltage component 7 with electrical energy, to start up the control device 8, and to provide the voltage supply for the drivers of the circuit breakers 11 through 16. In this way, the peak voltage 20 is again achieved before this first activation of the active short circuit. From this point in time, however, the control device 8 and the voltage supply for the drivers are kept active, and, within the control device 8, a two-point regulator is realized, which holds the voltage in the intermediate circuit between a second threshold value 22 and a third threshold value 23. The second threshold 22 is in this case already selected to be lower than the peak voltage 20, since this no longer has to be reached because all important components are kept active, and dead times thus eliminated. The third threshold value 23 is selected to be lower than the second threshold value 22, but is clearly higher than the first threshold value 21, so that neither the switching arrangement nor the control device 8 are deactivated from lack of electrical energy, but, instead, an intentional deactivation of the active short circuit takes place as soon as the intermediate circuit voltage falls below the third threshold value 23. The capacitor 17 is recharged until the intermediate circuit voltage reaches or exceeds the second threshold value, after which the active short circuit is reactivated by activation by means of the control device 8. This continues, so that the intermediate circuit voltage can be kept within a narrowly limited range, e.g., between 45 V and 55 V. In this way, not only can safety in the towing state (or other case of being externally driven) be increased, but the voltage supply including control electronics can always remain active, so that the switch-on cycles are drastically reduced. Dead times due to the start-up times—in particular, the voltage supply for the drivers—occur only before the first activation; cf. start-up time 19.

Figure 3:
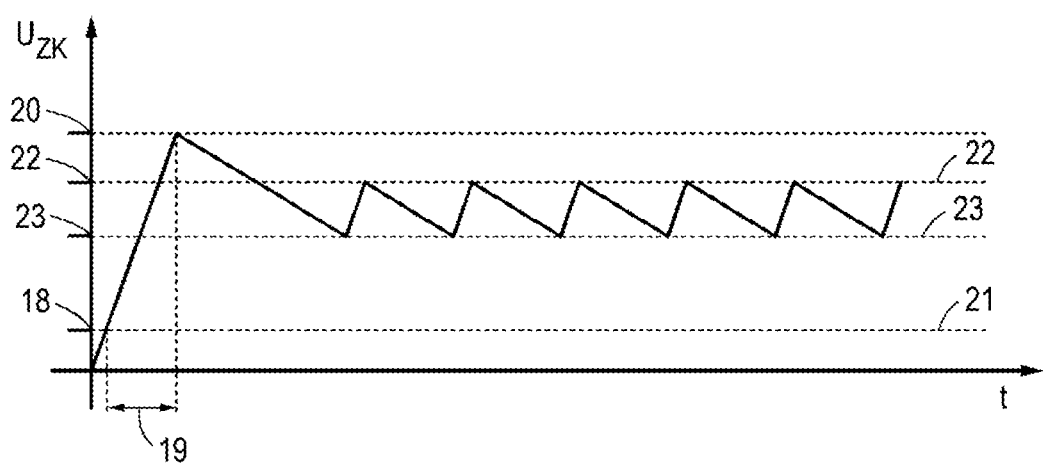
FIG. 3 illustrates a profile of the voltage in the intermediate circuit, according to one embodiment.

As FIG. 3 shows, a kind of pulsed operation of the active short circuit results, which can be understood as a pulse width modulation with a specific pulse frequency. The second and third threshold values 22, 23 can be selected in such a way that the pulse frequency lies in a specific frequency range. The specific frequency range can preferably be 500 to 1,000 hertz. The second third threshold values 22, 23 can be selected dynamically. An exceptionally rapid activation/deactivation cycle of the active short circuit then takes place, so that the voltage in the intermediate circuit remains essentially constant, and torque jumps on the synchronous machine 2 are kept less noticeable.

This application claims priority to German patent application no. 10 2019 124 214.2, filed Sep. 10, 2019, which is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a motor vehicle, having, as a prime mover, a permanently-excited synchronous machine with windings, during a driving of the motor vehicle by external means, wherein the synchronous machine is connected to a vehicle electrical system of the motor vehicle via a converter having a switching arrangement and a capacitor in an intermediate circuit, and the switching arrangement can be controlled via a control device connected to the vehicle electrical system, the method comprising:
   operating the permanently-excited synchronous machine as a generator during the driving by external means;
   providing, when a first threshold value for the voltage in the intermediate circuit is exceeded, energy generated by the synchronous machine and stored in the capacitor for operating the control device and the switching arrangement;
   activating the switching arrangement for short-circuiting the windings of the synchronous machine when a second threshold value for the voltage in the intermediate circuit is exceeded; and
   activating, when a third threshold value is undershot for the voltage in the intermediate circuit and when the short circuit is present, the switching arrangement in order to terminate the short circuit, wherein the third threshold value is selected to be higher than the first threshold value and higher than a minimum voltage for maintaining the switching state of the switching arrangement.

2. The method according to claim 1, wherein the control device is kept active after first activation of the control device, and/or the switching arrangement remains controllable at any time during this time period.

3. The method according to claim 1, further comprising dynamically selecting the second and third threshold values in order to set a pulse frequency, lying in a frequency range, of the voltage curve, occurring in the intermediate circuit by activating and deactivating the active short circuit, in the intermediate circuit.

4. The method according to claim 1, wherein the control device is connected to a low-voltage component of the vehicle electrical system, the low-voltage component is connected via a DC/DC converter to a high-voltage component of the vehicle electrical system, the high-voltage component is connected to the synchronous machine.

5. The method according to claim 1, wherein the switching arrangement has six circuit breakers, wherein the circuit breakers are field-effect transistors or IGBTs, wherein a respective driver for providing a gate voltage is assigned to each circuit breaker, wherein the gate voltage is fed, in particular, from the low-voltage component.

6. The method according to claim 1, wherein the second threshold value is selected to be smaller than a peak voltage occurring during a first start-up of the vehicle electrical system by the external drive.

7. The method according to claim 1, wherein the first threshold value is selected in a range of 20 to 40 V, the second threshold value in a range of 50 to 60 V, and the third threshold value is in a range of 35 to 50 V.

8. A motor vehicle comprising, as a prime mover, a permanently-excited synchronous machine with windings, wherein the synchronous machine is connected to a vehicle electrical system of the motor vehicle via a converter having a switching arrangement and a capacitor in an intermediate circuit, and the switching arrangement can be controlled via a control device connected to the vehicle electrical system, wherein the motor vehicle is designed to:

operate the permanently-excited synchronous machine as a generator;

provide, when a first threshold value for the voltage in the intermediate circuit is exceeded, energy generated by the synchronous machine and stored in the capacitor for operating the control device and the switching arrangement;

activate the switching arrangement for short-circuiting the windings of the synchronous machine when a second threshold value for the voltage in the intermediate circuit is exceeded; and activate, when a third threshold value is undershot for the voltage in the intermediate circuit and when the short circuit is present, the switching arrangement in order to terminate the short circuit, wherein the third threshold value is selected to be higher than the first threshold value and higher than a minimum voltage for maintaining the switching state of the switching arrangement.

\* \* \* \* \*